(12) United States Patent
Torii

(10) Patent No.: US 11,025,795 B2
(45) Date of Patent: Jun. 1, 2021

(54) OPERATION MODE CONTROL SYSTEM AND IMAGE FORMING APPARATUS

(71) Applicant: KYOCERA Document Solutions Inc., Osaka (JP)

(72) Inventor: Yasuhiro Torii, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 92 days.

(21) Appl. No.: 16/667,388

(22) Filed: Oct. 29, 2019

(65) Prior Publication Data

US 2020/0137256 A1 Apr. 30, 2020

(30) Foreign Application Priority Data

Oct. 31, 2018 (JP) .............................. JP2018-205082

(51) Int. Cl.
*H04N 1/00* (2006.01)
*G10L 25/51* (2013.01)

(52) U.S. Cl.
CPC ......... *H04N 1/00976* (2013.01); *G10L 25/51* (2013.01); *H04N 1/00034* (2013.01); *H04N 1/00925* (2013.01); *H04N 1/00952* (2013.01)

(58) Field of Classification Search
CPC .......... H04N 1/00976; H04N 1/00925; H04N 1/00952; H04N 1/00034
See application file for complete search history.

(56) References Cited

U.S. PATENT DOCUMENTS

| 2013/0250329 A1* | 9/2013 | Satoh | G06F 3/126 358/1.13 |
| 2016/0219175 A1* | 7/2016 | Uchida | H04N 1/00896 |
| 2019/0041958 A1* | 2/2019 | Clark | G06F 1/3206 |

FOREIGN PATENT DOCUMENTS

JP 2006011331 A 1/2006

* cited by examiner

*Primary Examiner* — King Y Poon
*Assistant Examiner* — Michael Burleson
(74) *Attorney, Agent, or Firm* — Alleman Hall Creasman & Tuttle LLP

(57) ABSTRACT

An operation mode control system includes an obtainment processing portion and a shift processing portion. The obtainment processing portion obtains sound volume data indicating a sound volume level of ambient sound around an image forming apparatus that is operating in a first mode in which all or a part of functions relating to image formation is restricted. The shift processing portion shifts, when a count of a number of times it is determined during a preset specific time period that the sound volume level is a first reference level or more, is a preset specific count or more, the image forming apparatus into a second mode in which it is possible for image formation to begin.

9 Claims, 13 Drawing Sheets

OPERATION MODE CONTROL SYSTEM AND IMAGE FORMING APPARATUS

INCORPORATION BY REFERENCE

This application is based upon and claims the benefit of priority from the corresponding Japanese Patent Application No. 2018-205082 filed on Oct. 31, 2018, the entire contents of which are incorporated herein by reference.

BACKGROUND

The present disclosure relates to an operation mode control system configured to control an operation mode of an image forming apparatus, and an image forming apparatus.

As a related art, there is known an image forming apparatus configured to shift an operation mode based on an output signal of an infrared sensor.

Specifically, the image forming apparatus shifts the operation mode to a first mode when it determines that the level of the output signal is less than a reference level. In the first mode, the temperature of a fixing portion of the image forming apparatus is controlled at a first temperature. The image forming apparatus shifts the operation mode from the first mode to a second mode when it determines that the level of the output signal is the reference level or higher. In the second made, the temperature of the fixing portion is controlled at a second temperature that is higher than the first temperature.

SUMMARY

An operation mode control system according to an aspect of the present disclosure includes an obtainment processing portion and a shift processing portion. The obtainment processing portion obtains sound volume data indicating a sound volume level of ambient sound around an image forming apparatus that is operating in a first mode in which all or a part of functions relating to image formation is restricted. The shift processing portion shifts, when a count of a number of times it is determined during a preset specific time period that the sound volume level is a first reference level or more, is a preset specific count or more, the image forming apparatus into a second mode in which it is possible for image formation to begin.

An image forming apparatus according to another aspect of the present disclosure includes the operation mode control system and an image forming portion. The image forming portion executes image formation.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings. It should be noted that the following embodiment is an example of a specific embodiment of the present disclosure and should not limit the technical scope of the present disclosure.

Figure 1:
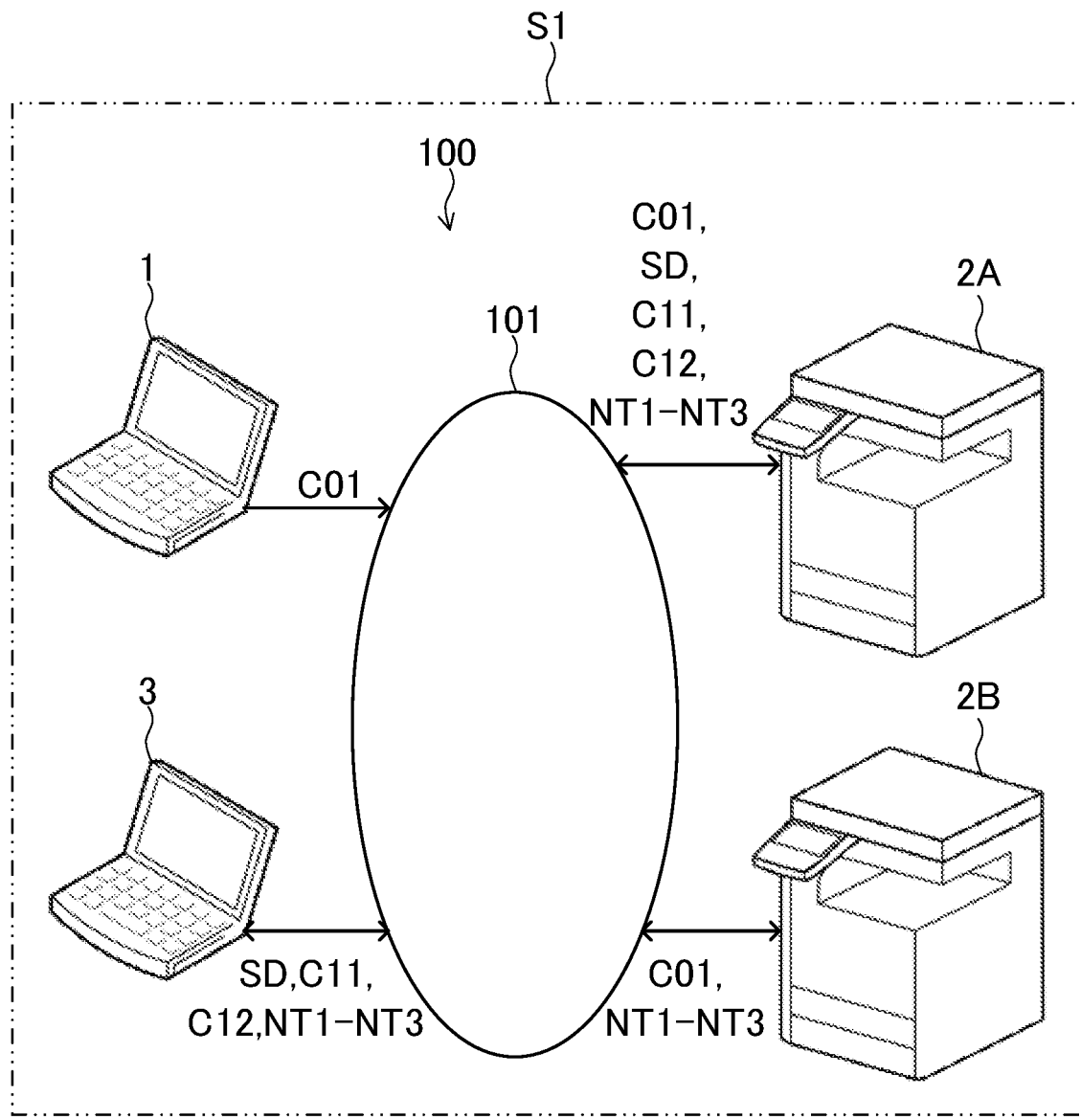
FIG. 1 is a schematic diagram of an operation mode control system according to an embodiment of the present disclosure.

In FIG. 1, an operation mode control system (hereinafter referred to simply as a system) 100 is installed in a space S1 such as an office space. The system 100 includes one information processing apparatus 1, two image forming apparatuses 2A and 2B, and a control apparatus 3, wherein all of which are communicable with one another via a network 101. It is noted that there may be one or more of the information processing apparatus, and two or more of the image forming apparatus. In addition, the information processing apparatus 1, the image forming apparatuses 2A and 2B, and the control apparatus 3 may be installed in different spaces (for example, different rooms or different floors).

The information processing apparatus 1 is a personal computer or the like, and is used by a user of the image forming apparatuses 2A and 2B at a location separate from the image forming apparatuses 2A and 2B. The information processing apparatus 1 includes a control portion, a display portion, and an operation input portion, and transmits, to the image forming apparatuses 2A and 2B via the network 101, an execution command C01 for image formation. The execution command C01 includes image data that is a target for the image formation performed by the image forming apparatuses 2A and 2B.

The image forming apparatuses 2A and 2B may each be a printer, a copier, a facsimile, or a multifunction peripheral. The multifunction peripheral includes a print function, a copy function, and a fax function. The image forming apparatuses 2A and 2B receive the execution command C01 from the information processing apparatus 1 via the network 101. Each of the image forming apparatuses 2A and 2B, in response to its reception of the execution command C01, executes image formation. In the image formation, the image forming apparatuses 2A and 2B each forms an image based on the image data included in the execution command C01 it has received, prints the image on a sheet such as a sheet of paper, and discharges the sheet.

Figure 2:
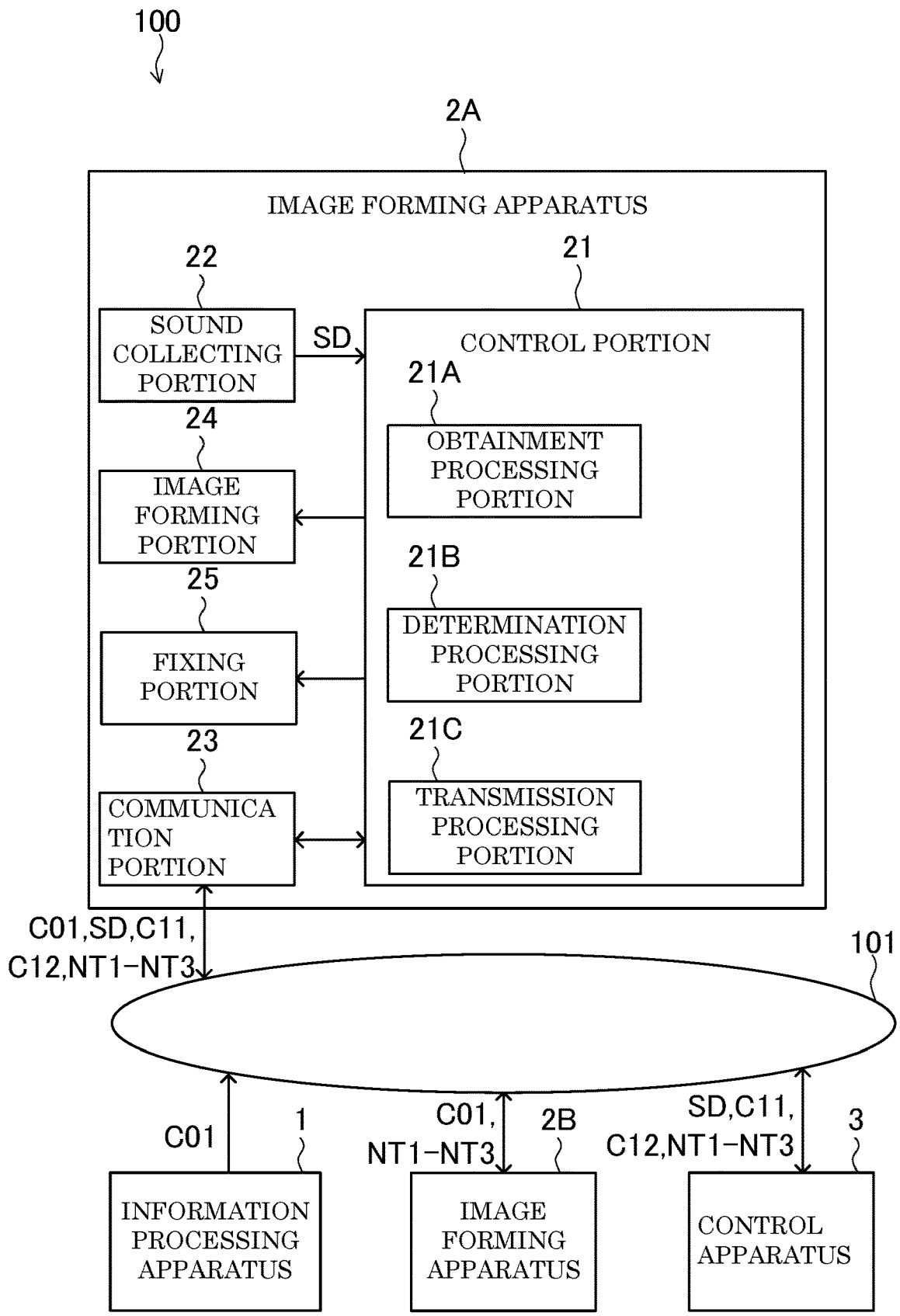
FIG. 2 is a block diagram of one configuration of the image forming apparatus shown in FIG. 1.

As shown in FIG. 2, the image forming apparatus 2A includes a control portion 21, a sound collecting portion 22, a communication portion 23, an image forming portion 24, and a fixing portion 25.

The control portion 21 includes a processor, a program storage portion, and a main storage portion. Specifically, the processor is a CPU or the like. The program storage portion is a ROM. The main storage portion is a RAM. The processor uses the main storage portion to execute programs that are preliminarily stored in the program storage portion. With this configuration, the control portion 21, the sound collecting portion 22, the communication portion 23, the image forming portion 24, and the fixing portion 25 are integrally controlled. It is noted that the control portion 21 may be an electric circuit such as an ASIC (Application Specific Integrated Circuit) or a DSP (Digital Signal Processor) or the like.

The sound collecting portion 22 is a microphone or the like, and is provided on a housing (not shown) of the image forming apparatus 2A. Ambient sound around the image forming apparatus 2A enters the sound collecting portion 22. The sound collecting portion 22 transmits, to the control portion 21, sound volume data SD indicating sound volume level of the ambient sound.

The communication portion 23 is a communication interface. The communication portion 23 transmits, to the control portion 21, data and information received via the network 101. Furthermore, the communication portion 23 transmits, to the control apparatus 3 via the network 101, the data and information received from the control portion 21.

The image forming portion 24 is an electrophotographic image forming portion, and includes an image-carrying member, a charging portion, an exposure portion, a developing portion, and a transfer portion. During the image formation, the image forming portion 24 forms, on the image-carrying member, a toner image that is an example of the image, and then transfers the toner image to the sheet.

The fixing portion 25 is a heat-fixing type fixing device, and includes a heater or the like that generates heat under the control of the control portion 21. During the image formation, the fixing portion 25 heats, to a fixing temperature T3, the sheet on which the toner image has been transferred. The fixing temperature T3 is a temperature at which the toner on the sheet melts. Furthermore, the fixing portion 25 applies pressure to the toner image. This allows for the toner image to be fixed on the sheet.

In addition, during the time when the image formation is not being executed, the control portion 21 operates while switching between a first operation mode and a second operation mode.

The first mode is an operation mode in which all or a part of functions relating to the image formation executed in the image forming apparatus 2A is restricted. Specifically, in the first mode, the power consumption of the image forming apparatuses 2A and 2B is restricted, and thus the function of the fixing portion 25 is restricted. More specifically, the temperature of the fixing portion 25 is controlled to a first temperature T1 that is lower than the fixing temperature T3.

It is noted that as another embodiment, the first mode may be an operation mode in which a function other than that of the fixing portion 25 is restricted.

The second mode is an operation mode in which the image forming apparatus 2A can begin the image formation. Specifically, in the second mode, the temperature of the fixing portion 25 is controlled to a second temperature T2. The second temperature T2 is lower than the fixing temperature T3 and higher than the first temperature T1.

It is noted that the first temperature T1, the second temperature T2, and the fixing temperature T3 are predetermined during the designing stage of the image forming apparatus 2A based on specifications of the image forming apparatus 2A. For example, the fixing temperature T3 is approximately 180° C. to 210° C., the first temperature T1 is less than 140° C., and the second temperature T2 is 160° C. to 170° C.

Figure 3:
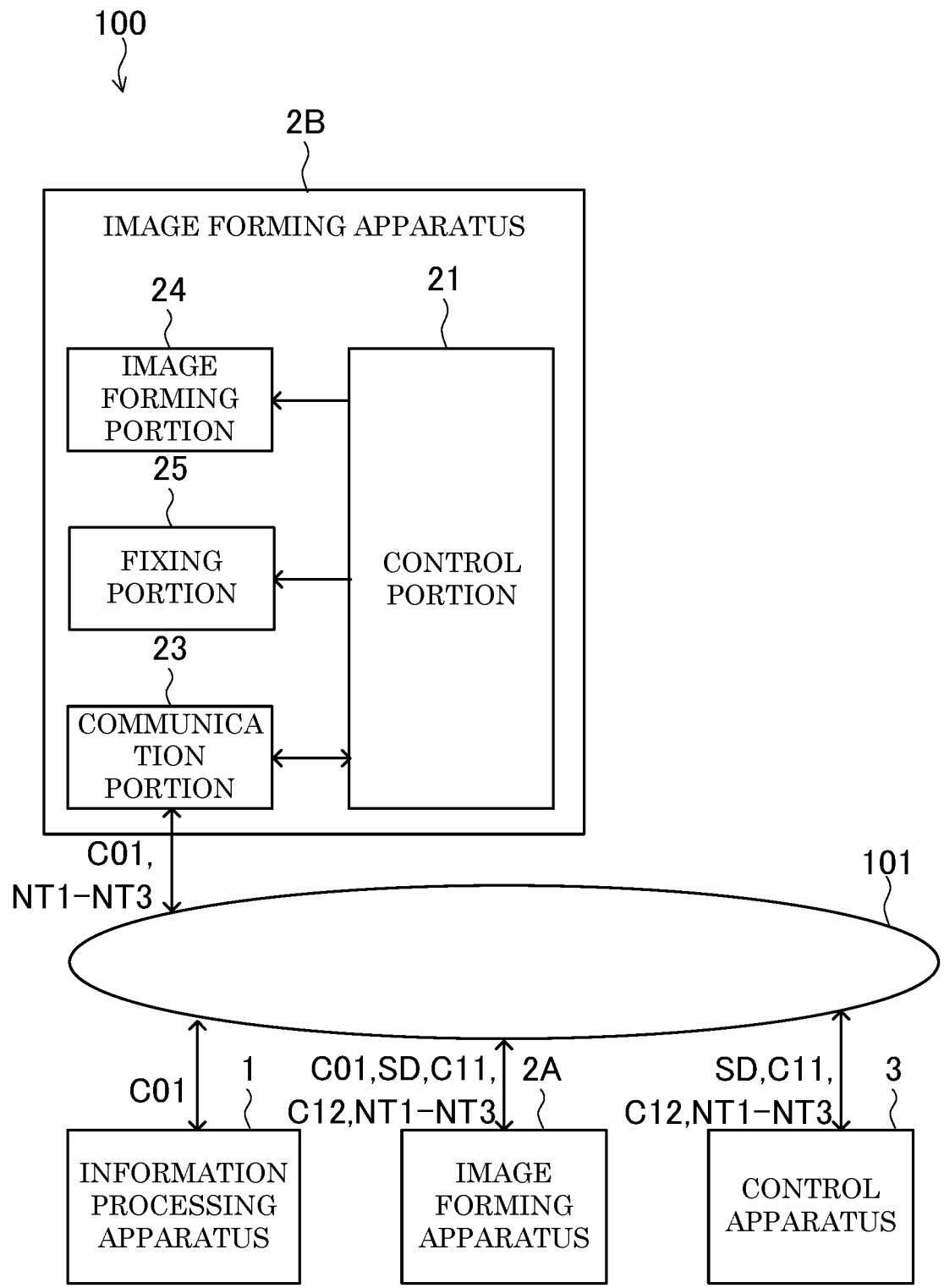
FIG. 3 is a block diagram of the other configuration of the image forming apparatus shown in FIG. 1.

As shown in FIG. 3, the image forming apparatus 2B differs from the image forming apparatus 2A (see FIG. 2) in that the image forming apparatus 2B does not include the sound collecting portion 22. Since the image forming apparatuses 2A and 2B do not have any other differences in their configurations, the description of the configuration of the image forming apparatus 2B is omitted.

In a conventional image forming apparatus, an execution command for image formation can be received from an information processing apparatus via a communication network. When the execution command is received, the image forming apparatus switches its operation mode from the first mode to the second mode. However, the image forming apparatus may not have finished switching from the first mode to the second mode when the user comes to retrieve printed matter at the installation location of the image forming apparatus.

In addition, in the related technology, determination that an output signal of the infrared sensor is a reference level or higher may be delayed due to obstructions existing around the image forming apparatus. As a result, in the related technology, the image forming apparatus may not have finished switching from the first mode to the second mode when the user comes to retrieve printed matter at the installation location of the image forming apparatus.

As a solution to this issue, according to the system 100, it is possible to reduce the delay of the shift from the first mode to the second mode.

As shown in FIG. 2, the control portion 21 of the image forming apparatus 2A includes, as multiple processing portions, an obtainment processing portion 21A, a determination processing portion 21B, and a transmission processing portion 21C. Specifically, the processor executes the programs to allow for the control portion 21 to function as the multiple processing portions. It is noted that the image forming apparatus 2B includes a similar control portion 21 as the image forming apparatus 2A. However, it is not necessary for the control portion 21 of the image forming apparatus 2B to include the multiple processing portions, as long as it can integrally control the communication portion 23, the image forming portion 24, and the fixing portion 25.

The obtainment processing portion 21A is configured to obtain, from the sound collecting portion 22, the sound volume data SD indicating the sound volume level of ambient sound around the image forming apparatus 2A operating in the first mode.

The determination processing portion 21B is configured to determine whether or not the sound volume level indicated by the sound volume data SD that is obtained by the obtainment processing portion 21A is higher than or equal to a second reference level L2 that is higher than a first reference level L1. Furthermore, the determination processing portion 21B determines whether or not the sound volume level indicated by the sound volume data SD that is obtained by the obtainment processing portion 21A is lower than or equal to a third reference level L3 that is lower than the first reference level L1.

The first reference level L1 is a reference value indicating whether or not the sound volume level indicated by the sound volume data SD is high. Generally, as more people exist in the space S1, the sound volume level becomes higher. Specifically, the first reference level L1 is a reference value for a determination processing portion 31B (see FIG. 4), described below, to determine whether or not many people exist in the space S1. The first reference level L1 is derived by a setting processing portion 31D (see FIG. 4) described below, and is set by the determination processing portion 31B. A more detailed description of the first reference level L1 is given below.

The second reference level L2 is preset to the sound volume level of the operation sound of the image forming apparatus 2A during the image formation. The sound volume level of the operation sound is obtained during the designing stage of the image forming apparatus 2A according to a predetermined measurement method.

The third reference level L3 is a value that is preset as the sound volume level measured in the space S1 that satisfies specific conditions A and B described below. The specific condition A is that no people exist in the space S1. The specific condition B is that the main power source of each of the image forming apparatuses 2A and 2B installed in the space S1 is turned off. It is noted that the third reference level L3 may be a sound volume level by which it can be assumed that the specific conditions A and B are satisfied (for example, a sound volume level that is close to 0).

The transmission processing portion 21C is configured to transmit, to the control apparatus 3, the sound volume data SD that has been determined by the determination processing portion 21B to indicate a sound volume level that is higher than the third reference level L3 and lower than the second reference level L2.

Figure 4:
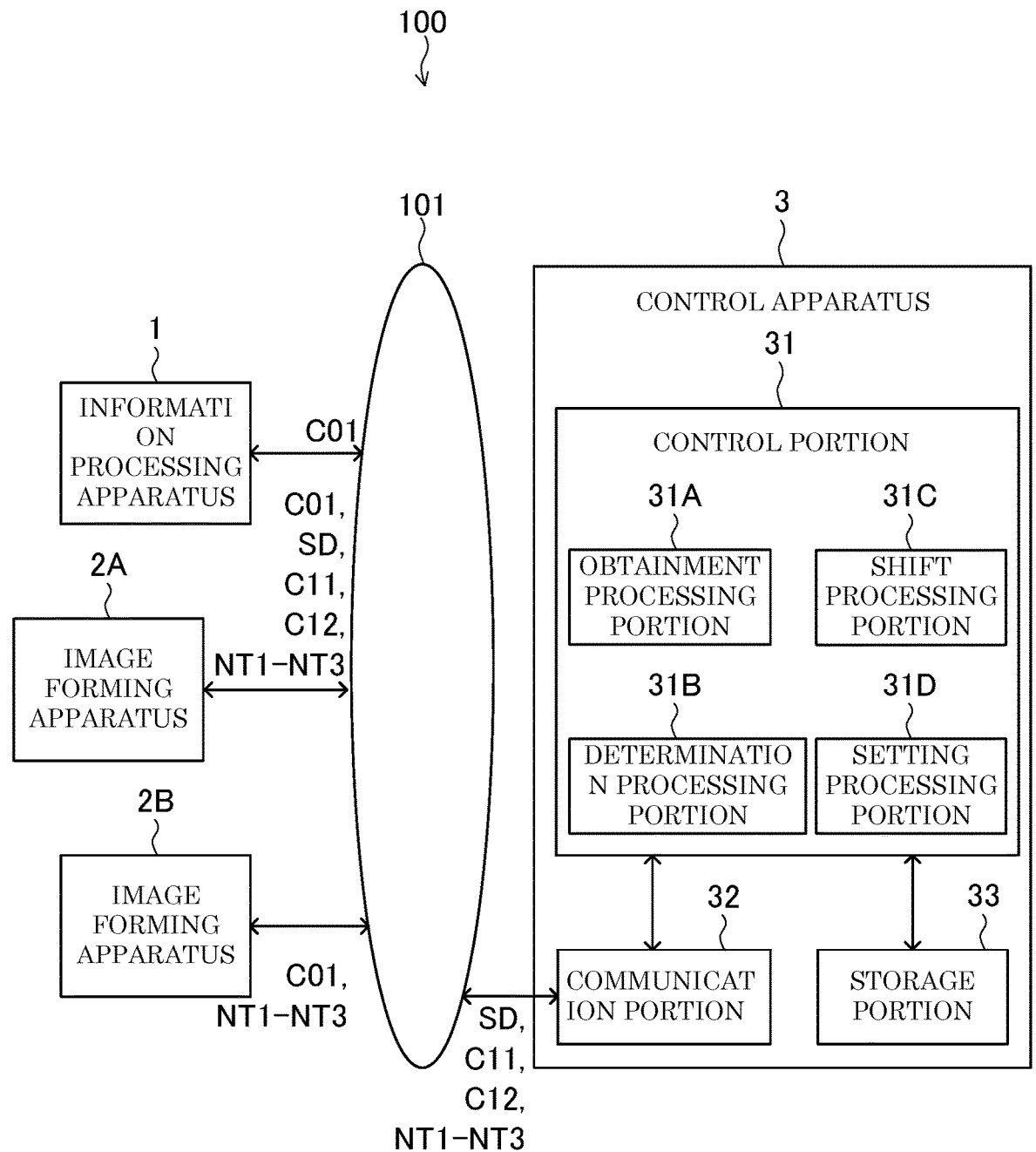
FIG. 4 is a block diagram of a configuration of the control apparatus shown in FIG. 1.

As shown in FIG. 1, the control apparatus 3 is a personal computer or the like, and is configured to control the operation modes of the image forming apparatuses 2A and 2B. Specifically, as shown in FIG. 4, the control apparatus 3 includes a control portion 31, a communication portion 32, and a storage portion 33.

The control portion 31 includes, as multiple processing portions, an obtainment processing portion 31A, the determination processing portion 31B, a shift processing portion 31C, and the setting processing portion 31D. The control portion 31 includes a processor, a program storage portion, and a main storage portion. The processor uses the main storage portion to execute programs that are preliminarily stored in the program storage portion. With this configuration, the control portion 31 integrally controls the control portion 31, the communication portion 32, and the storage portion 33, and functions as the multiple processing portions.

The obtainment processing portion 31A is configured to obtain the sound volume data SD that is transmitted from the image forming apparatus 2A.

When a count is taken of the number of times it is determined that the sound volume level of the sound volume data SD obtained by the obtainment processing portion 31A is the first reference level L1 or higher, and the count during a preset specific time period is a preset specific number of times or higher, the shift processing portion 31C is configured to shift the image forming apparatuses 2A and 2B into the second mode, in which image formation can begin.

The specific number of times is two or more. In this case, the shift processing portion 31C shifts the image forming apparatuses 2A and 2B into the second mode when it is determined, during the specific time period, that the consecutive number of times it is determined that the sound volume level is the first reference level L1 or higher, is greater than or equal to the specific number of times.

The setting processing portion 31D is configured to set the first reference level L1. The setting processing portion 31D sets the first reference level L1 based on the sound volume data SD that is obtained by the obtainment processing portion 31A.

The setting processing portion 31D sets the first reference level L1 based on the sound volume data SD that is obtained during a specific time period before the image formation begins.

The setting processing portion 31D sets the first reference level L1 based on one or more pieces of the sound volume data SD, among one or more pieces of the sound volume data SD obtained by the obtainment processing portion 21A of the image forming apparatus 2A (see FIG. 2), excluding those indicating a sound volume level that is higher than or equal to the second reference level L2 that is higher than the first reference level L1.

The setting processing portion 31D sets the first reference level L1 based on one or more pieces of the sound volume data SD, among one or more pieces of the sound volume data SD obtained by the obtainment processing portion 31A, excluding those indicating a sound volume level that is lower than or equal to the third reference level L3 that is lower than the first reference level L1.

Furthermore, the obtainment processing portion 31A obtains, from a predetermined plurality of the image forming apparatuses 2A and 2B, an execution state of the image formation in each of the image forming apparatuses 2A and 2B. In this case, when the execution state corresponding to any of the plurality of image forming apparatuses 2A and 2B indicates that the image formation is being executed, the shift processing portion 31C shifts, among the plurality of image forming apparatuses 2A and 2B, the other image forming apparatus from the second mode into the first mode.

The communication portion 32 is a communication interface. The communication portion 32 is controlled by the control portion 31 and transmits, to the storage portion 33, data and information received from the network 101. The communication portion 32 transmits, to the image forming apparatuses 2A and 2B via the network 101, the data and information received from the control portion 21.

The storage portion 33 is a nonvolatile storage device such as a semiconductor memory, and is configured to store the data and information received by the communication portion 32.

In the following, the operation of the system 100 is described in further detail.

Figure 5A:
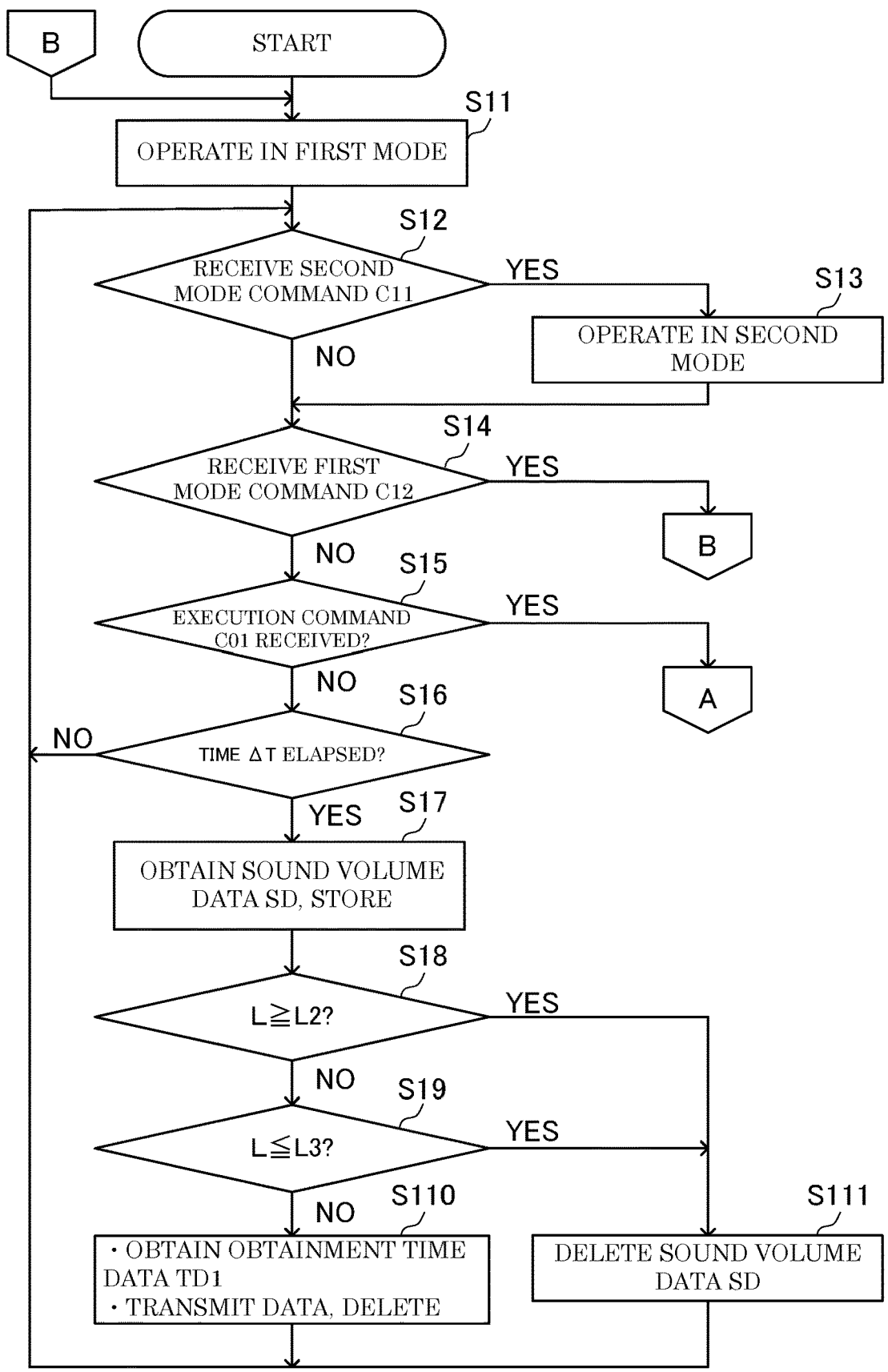
FIG. 5A is a flowchart showing a first part of a procedure for a process performed by the image forming apparatus shown in FIG. 2.
Figure 5B:
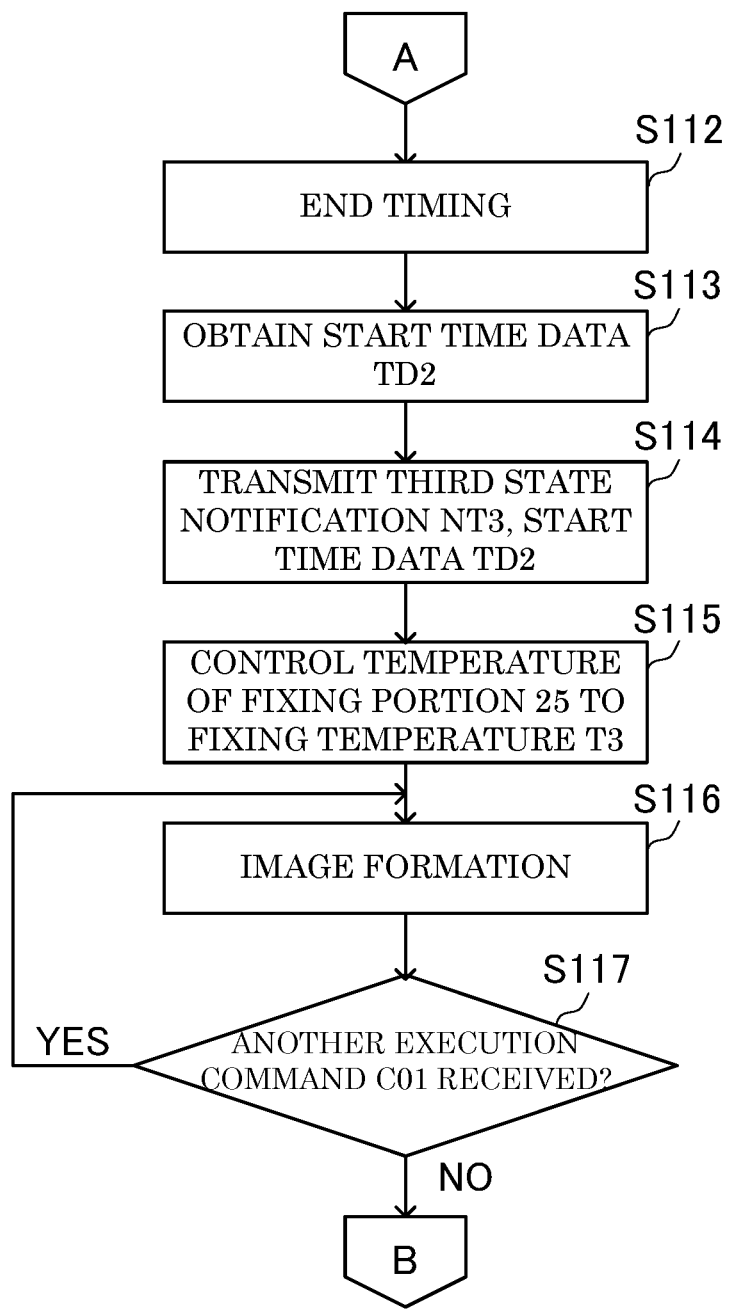
FIG. 5B is a flowchart showing a second part of the procedure for the process performed by the image forming apparatus shown in FIG. 2.

After the main power source of the image forming apparatus 2A is turned on, the control portion 21 of the image forming apparatus 2A executes a process according the procedure shown in FIG. 5A and FIG. 5B.

In step S11 of FIG. 5A, the control portion 21 causes the image forming apparatus 2A to operate in the first mode. Specifically, the control portion 21 controls the temperature of the fixing portion 25 at the first temperature T1. The control portion 21 transmits a first state notification NT1 to the control apparatus 3. The first state notification NT1 is information for notifying that the image forming apparatus 2A is operating in the first mode. The control portion 21 resets a timer (not shown) included therein and begins timing (step S11).

In step S12, the control portion 21 determines whether or not a second mode command C11 has been received. The second mode command C11 is information for commanding for the image forming apparatuses 2A and 2B to operate in the second mode, and is transmitted by the control apparatus 3 in step S39 of FIG. 7A. When the control portion 21 determines that the second mode command C11 has been received, the control portion 21 moves the process to step S13. When the control portion 21 determines that the second mode command C11 has not been received, the control portion 21 moves the process to step S14.

In step S13, the control portion 21 causes the image forming apparatus 2A to operate in the second mode. Specifically, the control portion 21 controls the temperature of the fixing portion 25 at the second temperature T2. The control portion 21 transmits a second state notification NT2 to the control apparatus 3. The second state notification NT2 is information for notifying, to the control apparatus 3, that the image forming apparatus 2A is operating in the second mode (step S13).

When the sound volume level of the sound volume data SD transmitted by the image forming apparatus 2A satisfies a specific condition, the control apparatus 3 assumes that many people exist in the space S1 and thus it is likely that the information processing apparatus 1 will transmit the execution command C01, and transmits the second mode command C11 to the image forming apparatuses 2A and 2B. It is noted that the specific condition is described below in detail in the description of step S38 of FIG. 7A.

When the image forming apparatus 2A receives the second mode command C11 while operating in the first mode, the image forming apparatus 2A shifts from the first mode to the second mode, and raises the temperature of the fixing portion 25 from the first temperature T1 to the second temperature T2. In this way, the image forming apparatus 2A controls the temperature of the fixing portion 25 at the second temperature T2 before receiving the execution command C01 from the information processing apparatus 1. With this configuration, it is possible to reduce the delay of the shift in the image forming apparatus 2A from the first mode to the second mode.

In step S14, the control portion 21 determines whether or not a first mode command C12 has been received. The first mode command C12 is information for commanding for the image forming apparatuses 2A and 2B to operate in the first mode, and is transmitted by the control apparatus 3 in step S310 of FIG. 7A. When it is determined by the control portion 21 that the first mode command C12 has been received, the control portion 21 returns the process to step S11. On the other hand, when the control portion 21 determines that the first mode command C12 has not been received, the control portion 21 moves the process to step S15.

In step S15, the control portion 21 determines whether or not the execution command C01 has been received from the information processing apparatus 1. When the control portion 21 determines that the execution command C01 has been received, the control portion 21 moves the process to step S112 of FIG. 5B. On the other hand, when the control portion 21 determines that the execution command C01 has not been received, the control portion 21 moves the process to step S16.

In step S16, the control portion 21 determines whether or not a predetermined time ΔT has elapsed from when the timing began. Step S16 is normally executed multiple times after the timing begins. Each time step S16 is executed for the second time or more, the control portion 21 determines whether or not the time ΔT has elapsed from the last execution of the step S16. When the control portion 21 determines that the time ΔT has not elapsed, the control portion 21 returns the process to step S12. On the other hand, when the control portion 21 determines that the time ΔT has elapsed, the control portion 21 moves the process to step S17.

In step S17, the control portion 21 functions as the obtainment processing portion 21A and obtains the sound volume data SD that is output from the sound collecting portion 22. Then, the control portion 21 stores the sound volume data SD to its internal RAM or the like.

In steps S18 and S19, the control portion 21 functions as the determination processing portion 21B.

In step S18, the determination processing portion 21B determines whether or not the sound volume level of the sound volume data SD in the RAM is the second reference level L2 or higher. When the determination processing portion 21B determines that the sound volume level is not the second reference level L2 or higher, the determination processing portion 21B moves the process to step S19. When the determination processing portion 21B determines that the sound volume level is the second reference level L2 or higher, the determination processing portion 21B moves the process to step S111.

In step S19, the determination processing portion 21B determines whether or not the sound volume level of the sound volume data SD in the RAM is the third reference level L3 or lower. When the determination processing portion 21B determines that the sound volume level is not the third reference level L3 or lower, the determination processing portion 21B moves the process to step S110. When the determination processing portion 21B determines that the sound volume level is the third reference level L3 or lower, the determination processing portion 21B moves the process to step S111. In step S111, the control portion 21 deletes the sound volume data SD in the RAM and returns the process to step S11.

In step S110, the control portion 21 functions as the transmission processing portion 21C. The control portion 21 includes a counter (not shown) for counting a value indicating time and date. The transmission processing portion 21C is configured to obtain, from the counter, the value indicating the time and date as obtainment time data TD1. The obtainment time data TD1 indicates the time when the sound volume data SD in the RAM was obtained. The transmission processing portion 21C transmits, to the control apparatus 3, the sound volume data SD in the RAM and the obtainment time data TD1 corresponding to the sound volume data SD. Then, the transmission processing portion 21C deletes the sound volume data SD in the RAM and the obtainment time data TD1 (step S110). Then, the control portion 21 returns the process to step S11.

In steps S11 to S111, the image forming apparatus 2A determines that a piece of sound volume data SD, having a sound volume level that is the third reference level L3 or lower or the second reference level L2 or higher, is noise, and does not transmit it to the control apparatus 3. With this configuration, the control apparatus 3 can transmit the second mode command C11 or the first mode command C12 based on the sound volume data SD having a sound volume level that correlates with the amount of noise that is generated by the voices or activity of people in the space S1.

In step S112 of FIG. 5B, the control portion 21 ends timing by the timer. Next, in step S113, the control portion 21 obtains, from the counter, start time data TD2 indicating the time and date, and stores it in the RAM. The start time data TD2 indicates the time when the image forming apparatus 2A begins image formation.

Next, in step S114, the control portion 21 functions as the transmission processing portion 21C. The transmission processing portion 21C is configured to transmit, to the control apparatus 3, the start time data TD2 in the RAM and third state notification NT3. The third state notification NT3 is information for indicating that the image forming apparatus 2A is forming an image. In step S115, the control portion 21 controls the temperature of the fixing portion 25 at the fixing temperature T3. In step S116, the control portion 21 executes the image formation based on image data included in the execution command C01 that was received in step S15 (see FIG. 5A). After the execution of the image formation ends, in step S117, the control portion 21 determines whether or not another execution command C01 has been received from the information processing apparatus 1. When the control portion 21 determines that another execution command C01 has been received, the control portion 21 returns the process to step S116. On the other hand, when the control portion 21 determines that another execution command C01 has not been received, the control portion 21 returns the process to step S11 of FIG. 5A.

Figure 6:
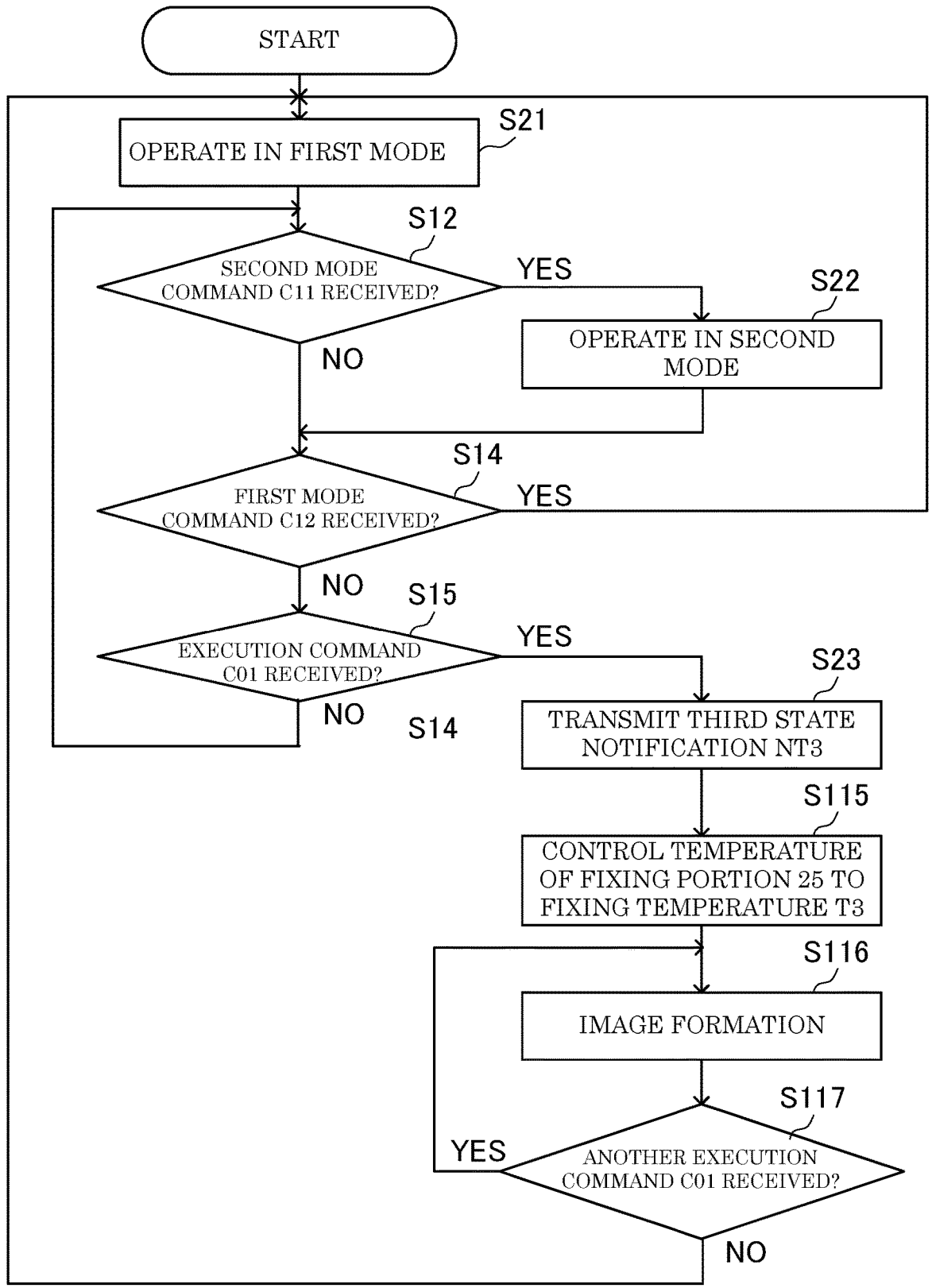
FIG. 6 is a flowchart showing a procedure for a process performed by the image forming apparatus shown in FIG. 3.

The control portion 21 of the image forming apparatus 2B executes a process according to the procedure shown in FIG. 6. FIG. 6 differs from FIG. 5A and FIG. 5B in the following ways. That is, in the procedure shown in FIG. 6, the steps S16 to S113 of FIG. 5A and FIG. 5B are not executed, and instead of steps S11, S13, and S114 of FIG. 5A and FIG. 5B, steps S21, S22, and S23 are executed respectively. For this reason, in FIG. 6, the steps that are equivalent to those shown in FIG. 5A and FIG. 5B are denoted with the same step numbers, and descriptions thereof are omitted.

In step S21 of FIG. 6, the control portion 21 of the image forming apparatus 2B controls the temperature of the fixing portion 25 at the first temperature T1. In step S22, the control portion 21 controls the temperature of the fixing portion 25 at the second temperature T2. In step S23, the control portion 21 transmits the third state notification NT3 to the control apparatus 3. The communication portion 23 is information indicating that the image forming apparatus 2B is forming an image.

Figure 7A:
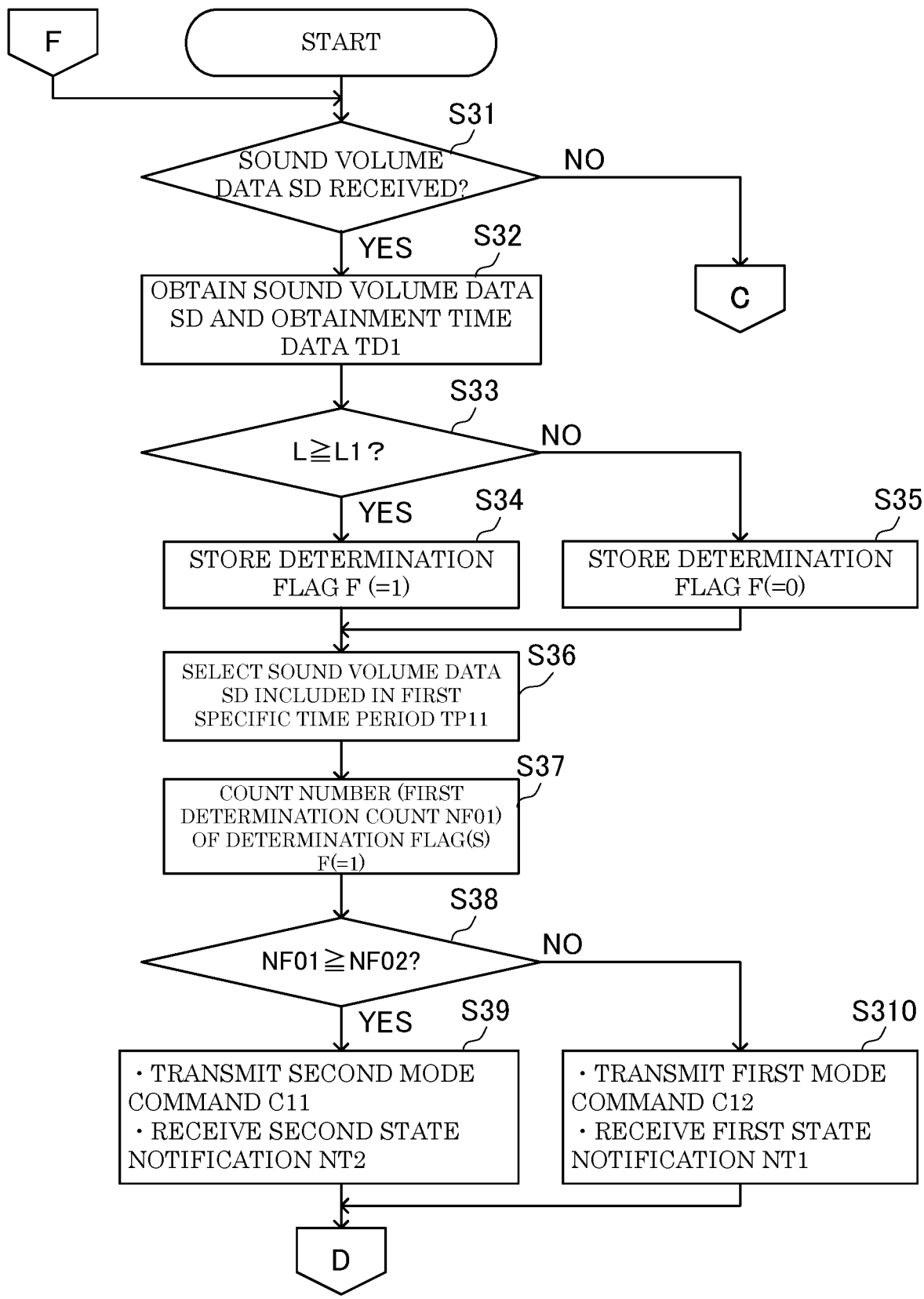
FIG. 7A is a flowchart showing a first part of a procedure for a process performed by the control apparatus shown in FIG. 4.
Figure 7B:
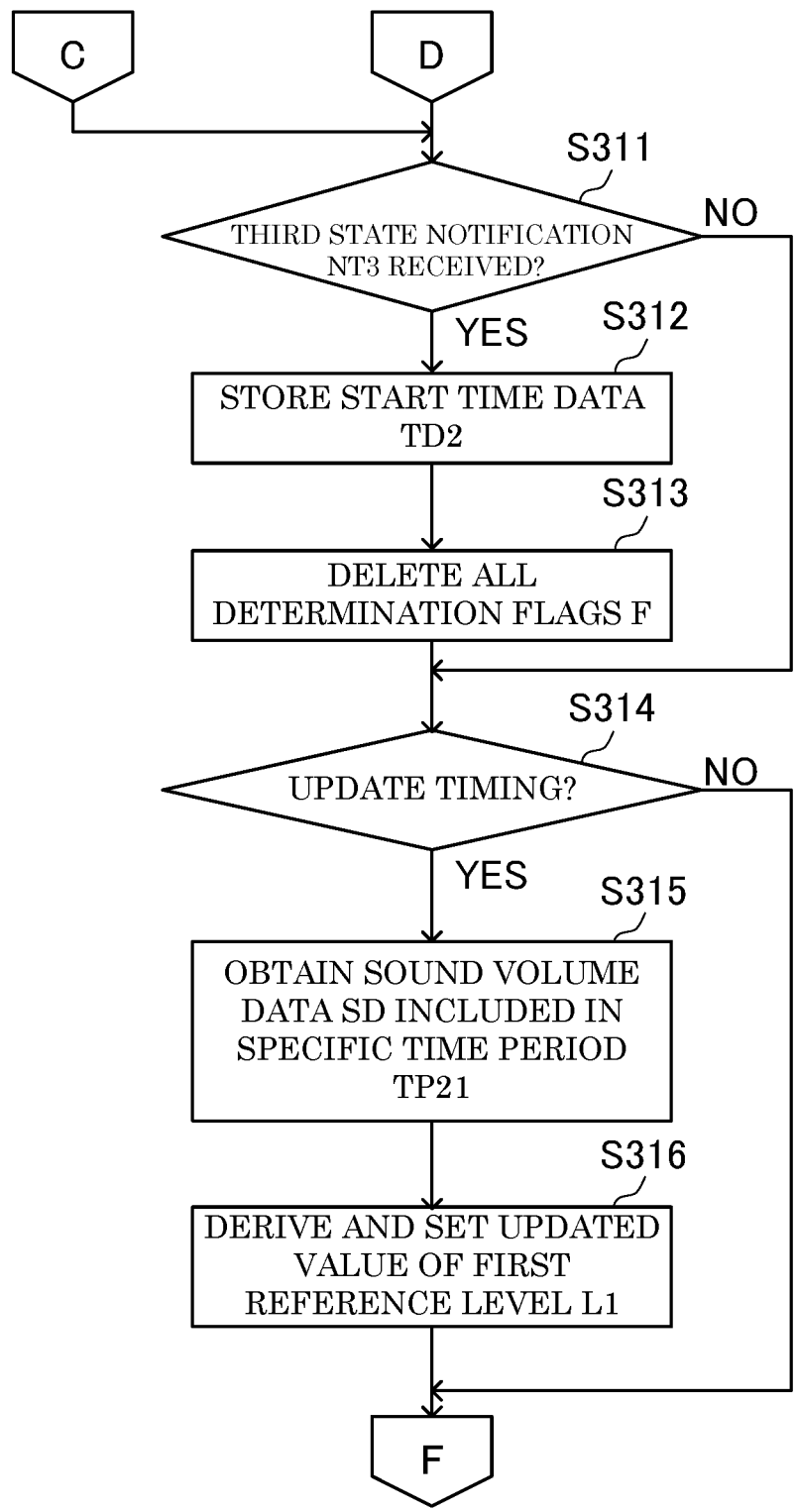
FIG. 7B is a flowchart showing a second part of the procedure for the process performed by the control apparatus shown in FIG. 4.

After the main power source of the control apparatus 3 is turned on, the control portion 31 of the control apparatus 3 executes a process according to the procedure shown in FIG. 7A and FIG. 7B.

In step S31 of FIG. 7A, the control portion 31 determines whether or not the communication portion 32 has received the sound volume data SD from the image forming apparatus 2A. When the control portion 31 determines that the sound volume data SD has been received by the communication portion 32, the control portion 31 moves the process to step S32. On the other hand, when the control portion 31 determines that the sound volume data SD has not been received, the control portion 31 moves the process to step S311 of FIG. 7B.

The communication portion 32 is configured to receive the obtainment time data TD1 in addition to the sound volume data SD. In step S32, the control portion 31 functions as the obtainment processing portion 31A. The obtainment processing portion 31A is configured to obtain the sound volume data SD and the obtainment time data TD1 corresponding to the sound volume data SD. Specifically, the obtainment processing portion 31A causes the communication portion 32 to transmit, to the storage portion 33, the sound volume data SD and the obtainment time data TD1. The storage portion 33 is configured to store pieces of the sound volume data SD and obtainment time data TD1 in chronological order (see FIG. 8).

In steps S33 to S38, the control portion 31 functions as the determination processing portion 31B.

In step S33, the determination processing portion 31B selects the target for processing in steps S33 to S38. The processing target is the sound volume data SD stored in the storage portion 33 in step S32 immediately before step S33.

In step S33, the determination processing portion 31B determines whether or not the sound volume level indicated by the processing target is the first reference level L1 or more. When the determination processing portion 31B determines that the sound volume level is the first reference level L1 or more, the determination processing portion 31B moves the process to step S34. When the determination processing portion 31B determines that the sound volume level is less than the first reference level L1, the determination processing portion 31B moves the process to step S35.

In steps S34 and S35, the determination processing portion 31B stores, to the storage portion 33, a determination flag F in correspondence with the processing target. The determination flag F is information for indicating whether or not the sound volume level of the processing target is the first reference level L1 or more, and specifically, the determination flag F is binary information indicated a "0" or "1". The determination flags F indicating "0" and "1" are respectively stored to the storage portion 33 in steps S34 and S35.

After the processing in steps S34 and S35 ends, in step S36, the determination processing portion 31B selects, from the pieces of sound volume data SD in the storage portion 33, pieces of the sound volume data SD included in a preset first specific time period TP11. The first specific time period TP11 is a first example of a specific time period according to the present disclosure.

Figure 8:
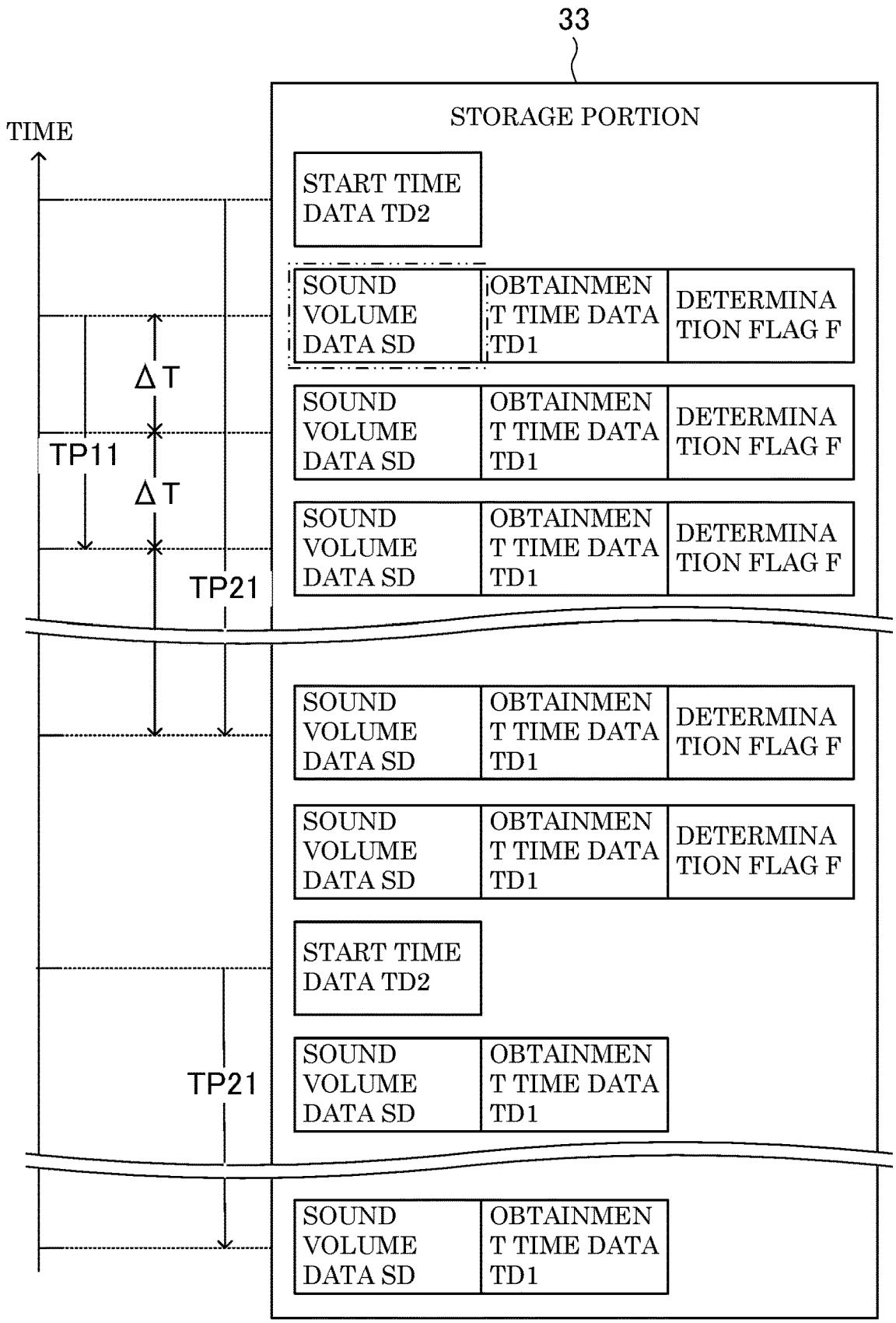
FIG. 8 is a schematic diagram showing content of processing performed by the control apparatus shown in FIG. 4.

Specifically, as shown in FIG. 8, the storage portion 33 is stored with the pieces of the sound volume data SD in chronological order. Each piece of the sound volume data SD is made to correspond with the obtainment time data TD1 and the determination flag F. In addition, the first specific time period TP11 is predetermined as a time period that is twice or more as long as the time ΔT. In step S36, the determination processing portion 31B selects the sound volume data SD that has been made to correspond to the determination flag F and is included in a time period between the time and date indicated by the obtainment time data TD1 corresponding to the processing target, and a time and date that is earlier, by the first specific time period TP11, than the time and date indicated by the obtainment time data TD1 corresponding to the processing target.

Next, in step S37, the determination processing portion 31B counts, as a first determination count NF01, the number of determination flags F that are included in the first specific time period TP11 and indicate "1". The first determination count NF01 is an example of a count according to the present disclosure.

In step S38, the determination processing portion 31B determines whether or not the first determination count NF01 is a preset first specific count NF02 or more. The first specific count NF02 is a first example of a specific count according to the present disclosure, and is value that is two or more. By setting the first specific count NF02 as a value that is two or more, it is possible to determine more accurately that many people exist in the space S1. In addition, the specific condition is that the first determination count NF01 is the first specific count NF02 or more. When the determination processing portion 31B determines that the first determination count NF01 is the first specific count NF02 or more, the determination processing portion 31B moves the process to step S39. When the determination processing portion 31B determines that the first determination count NF01 is less than the first specific count NF02, the determination processing portion 31B moves the process to step S310.

In steps S39 and S310, the control portion 31 functions as the shift processing portion 31C.

In step S39, the shift processing portion 31C transmits the second mode command C11 to the image forming apparatuses 2A and 2B. Then, the shift processing portion 31C receives the second state notification NT2 from the image forming apparatuses 2A and 2B.

In step S310, the shift processing portion 31C transmits the first mode command C12 to the image forming apparatuses 2A and 2B. Then, the shift processing portion 31C receives the first state notification NT1 from the image forming apparatuses 2A and 2B.

After the processing in steps S39 and S310 ends, the control portion 31 moves the process to step S311 of FIG. 7B.

In the control apparatus 3, when the specific condition is satisfied, the control portion 31 assumes that many people exist in the space S1 and thus it is likely that the execution command C01 will be transmitted, and transmits the second mode command C11 to cause the image forming apparatuses 2A and 2B to operate in the second mode. In addition, the control apparatus 3 controls the operation modes of the image forming apparatuses 2A and 2B based on the sound volume data SD indicating a volume level of a sound that can propagate easily throughout the space S1. With this configuration, it is possible to reduce the delay of the shift in the image forming apparatuses 2A and 2B from the first mode to the second mode.

In step S311 of FIG. 7B, the control portion 31 determines whether or not the communication portion 32 has received, from either the image forming apparatus 2A or the image forming apparatus 2B, the third state notification NT3. When the control portion 31 determines that the communication portion 32 has not received the third state notification NT3, the control portion 31 moves the process to step S314. When the control portion 31 determines that the communication portion 32 has received the third state notification NT3, the control apparatus 3 moves the process to step S312.

In step S312, the control portion 31 obtains the start time data TD2 in addition to the third state notification NT3. Specifically, the control portion 31 transfers the third state notification NT3 and the start time data TD2 from the communication portion 32 to the storage portion 33, and stores them therein. In step S313, the control portion 31 deletes the determination flag F made to correspond to the sound volume data SD in the storage portion 33, and moves the process to step S314.

In step S314, the control portion 31 determines whether or not an update timing of the first reference level L1 has come. The update timing is a time and date that can be set by a user operation on the operation input portion (not shown) of the control apparatus 3. Specifically, the update timing is set in a period of the day such as nighttime when the frequency at which the image forming apparatuses 2A and 2B execute image formation is low. In addition, approximately one update timing is set per day. When the control portion 31 determines that the update timing has not come, the control portion 31 returns the process to step S31 of FIG. 7A. When the control portion 31 determines that the update timing has come, the control portion 31 moves the process to step S315.

In step S315, the control portion 31 functions as the setting processing portion 31D, and obtains, from the pieces of sound volume data SD in the storage portion 33, pieces of the sound volume data SD that are included in a specific time period TP21 that is at a timing before the image forming apparatus 2A begins image formation.

Specifically, as shown in FIG. 8, the storage portion 33 is stored with at least one piece of the start time data TD2. The setting processing portion 31D obtains, from the storage portion 33, pieces of the sound volume data SD included in the specific time period TP21 that is the time period between the time and date indicated by the start time data TD2, and the time and date that is earlier, by a predetermined time period, than the time and date indicated by the start time data TD2. The time period is determined appropriately according to experiments or the like during the designing stage of the control apparatus 3, and is, for example, approximately ten minutes.

Next, the setting processing portion 31D derives an updated value of the first reference level L1 based on the sound volume level indicated by the sound volume data SD obtained in step S315, and sets the value in the storage portion 33. The updated value is a value that is obtained by statistically processing the sound volume levels indicated by all pieces of the sound volume data SD obtained in step S315. Specifically, the updated value is a lower limit value, an average value, or a median value.

As described above, the setting processing portion 31D sets the first reference level L1 based on the sound volume level in the space S1 before execution of the image formation. Accordingly, it is possible for the control apparatus 3 to transmit the second mode command C11 (see FIG. 7A) at a timing at which image formation can be easily executed by the image forming apparatuses 2A and 2B.

When the processing in step S316 ends, the control portion 31 deletes all pieces of the sound volume data SD, obtainment time data TD1, and start time data TD2 in the storage portion 33, and returns the process to step S31.

It is noted that in the system 100, the control apparatus 3 includes the obtainment processing portion 31A, the determination processing portion 31B, the shift processing portion 31C, and the setting processing portion 31D. However, the configuration of the system 100 is not limited to this, and the image forming apparatus 2A may include the determination processing portion 31B, the shift processing portion 31C, and the setting processing portion 31D. In this case, the system 100 may not include the control apparatus 3.

Figure 9:
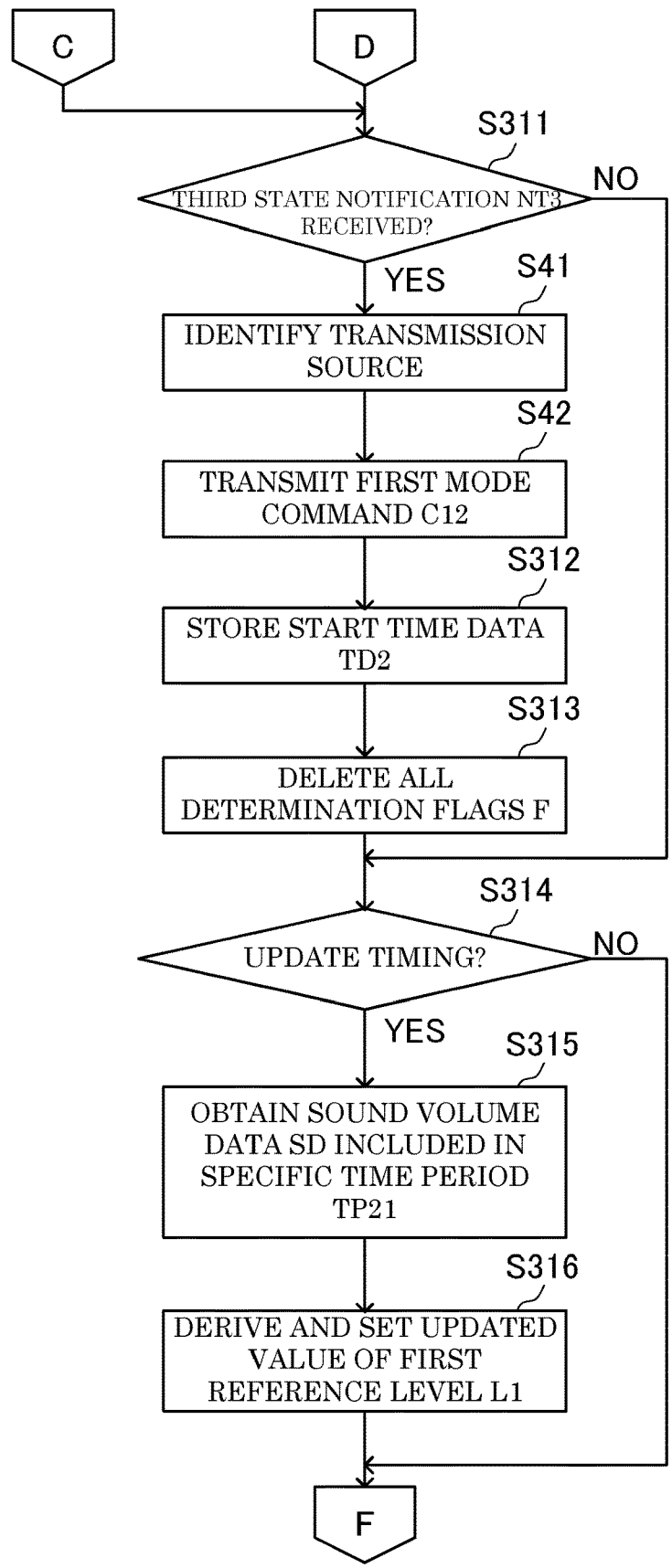
FIG. 9 is a flowchart showing another example of the procedure for the processing performed by the control apparatus shown in FIG. 4.

In addition, in the control apparatus 3, the control portion 31 may execute the process according to the procedure shown in FIG. 9, instead of that shown in FIG. 7B. The procedure shown in FIG. 9 differs from that of FIG. 7B in that the procedure in FIG. 9 further includes steps S41 and S42. For this reason, the steps shown in FIG. 9 that are equivalent to those in FIG. 7B are denoted with the same step numbers, and descriptions thereof are omitted.

When the control portion 31 determines in step S311 that the obtainment processing portion 31A has received the third state notification NT3, the control portion 31 identifies, in step S41, the transmission source of the third state notification NT3 (that is, one of the image forming apparatus 2A or image forming apparatus 2B). The third state notification NT3 is an example of an execution state according to the present disclosure. It is noted that in order to allow the control portion 31 to identify the transmission source, the control portions 21 of the image forming apparatuses 2A and 2B adds, to the third state notification NT3, identification information for identifying the image forming apparatuses 2A and 2B, and transmits the third state notification NT3 to the control apparatus 3.

Next, in step S42, the control portion 31 functions as the shift processing portion 31C, and transmits the first mode command C12 to, among the image forming apparatuses 2A and 2B, the image forming apparatus that is not the transmission source. With this configuration, when one of the image forming apparatuses 2A and 2B executes image formation, it is possible for the shift processing portion 31C to shift the other one of the image forming apparatuses 2A and 2B into the first mode. This allows for the reduction of power consumption by the other image forming apparatus. It is noted that the processing in steps S41 and S42 is especially effective when the image forming apparatuses 2A and 2B are installed in the same space S1. After transmitting the first mode command C12, the shift processing portion 31C receives the first state notification NT1 from the other image forming apparatus. Then, the control portion 31 moves the process to step S312.

Figure 10:
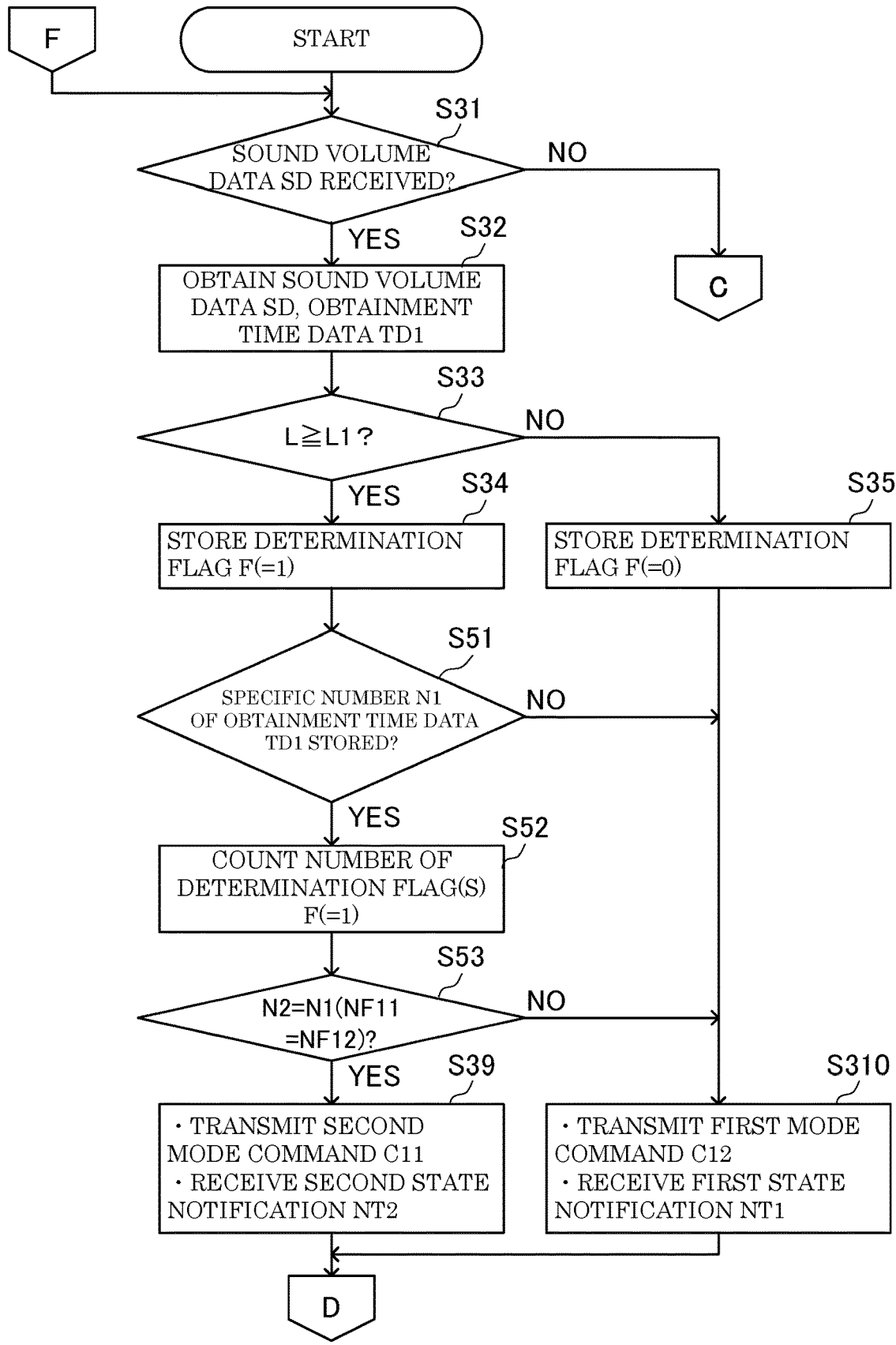
FIG. 10 is a flowchart showing a further example of the procedure for the processing performed by the control apparatus shown in FIG. 4.

In addition, the control portion 31 may execute the process according to the procedure shown in FIG. 10, instead of that shown in FIG. 7A. The procedure shown in FIG. 10 differs from that shown in FIG. 7A in that according to the procedure in FIG. 10, step S310 is executed after step S35, and steps S51 to S53 are executed instead of steps S36 to S38. For this reason, the steps shown in FIG. 10 that are equivalent to those in FIG. 7A are denoted with the same step numbers, and descriptions thereof are omitted.

In steps S51 to S53, the control portion 31 functions as the determination processing portion 31B.

Figure 11:
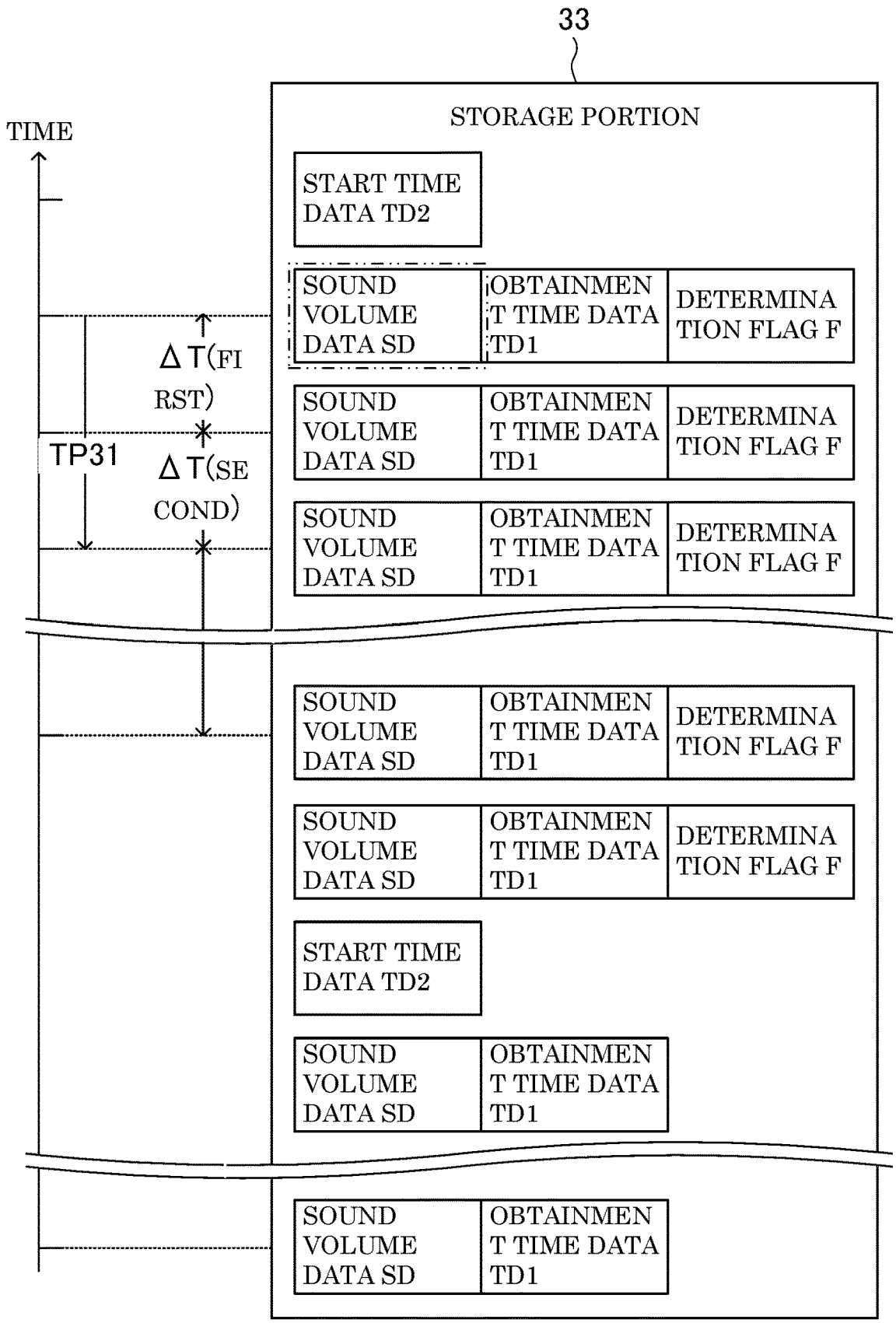
FIG. 11 is a schematic diagram showing another example of content of processing performed by the control apparatus shown in FIG. 4.

In step S51 after step S34, the determination processing portion 31B determines whether or not a specific number N1 (a natural number of two or more) of pieces of the obtainment time data TD1 have been stored in the storage portion 33. Specifically, as shown in FIG. 11, the specific number N1 pieces of the obtainment time data TD1 each indicate the time and date of each time the time $\Delta T$ elapses. In addition, the times and dates indicated by the specific number N1 pieces of the obtainment time data TD1 includes the times and dates between the time and date indicated by the obtainment time data TD1 of the processing target, and the time and date that is earlier, by a second specific time period TP31, than the time and date indicated by the obtainment time data TD1 of the processing target. The second specific time period TP31 is the specific number N1×time $\Delta T$. When the determination processing portion 31B determines that the specific number N1 pieces of the obtainment time data TD1 have not been stored in the storage portion 33, the determination processing portion 31B moves the process to step S310. When the determination processing portion 31B determines that the specific number N1 pieces of the obtainment time data TD1 have been stored in the storage portion 33, the determination processing portion 31B moves the process to step S52.

In step S52, the determination processing portion 31B counts, from the determination flags F corresponding to the specific number N1 pieces of obtainment time data TD1, the number N2 pieces of determination flags F that indicate "1".

Next, in step S53, the determination processing portion 31B determines whether or not the number N2 and the specific number N1 are the same value as one another. When the determination processing portion 31B determines that the number N2 and the specific number N1 are the same value as one another, the determination processing portion 31B moves the process to step S39. In this case, when a second determination count NF11, that is the number of times it is consecutively determined during the second specific time period TP31 that the sound volume level is the first reference level L1 or more, is a second specific count NF12, the shift processing portion 31C causes the image forming apparatuses 2A and 2B to shift into the second mode. This allows for a more accurate determination of when many people exist in the space S1. Here, the second specific time period TP31 is another example of the specific time period according to the present disclosure. In addition, the second determination count NF11 is equivalent to the number N2, and is a second example of the count according to the present disclosure. The second specific count NF12 is equivalent to the specific number N1, and is a second example of the count.

On the other hand, when the determination processing portion 31B determines that the number N2 and the specific number N1 are not the same value as one another, the determination processing portion 31B moves the process to step S310.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An operation mode control system, comprising:
   an obtainment processing portion configured to obtain sound volume data indicating a sound volume level of ambient sound around an image forming apparatus that is operating in a first mode in which all or a part of functions relating to image formation is restricted, and
   a shift processing portion configured to, when a count of a number of times it is determined during a preset specific time period that the sound volume level is a first reference level or more, is a preset specific count or more, shift the image forming apparatus into a second mode in which it is possible for image formation to begin.

2. The operation mode control system according to claim 1, wherein
   the specific count is 2 or more, and
   when a count of a number of times it is determined consecutively during the specific time period that the sound volume level is the first reference level or more, is the specific count or more, the shift processing portion shifts the image forming apparatus into the second mode.

3. The operation mode control system according to claim 1, further comprising
   a setting processing portion configured to set the first reference level, wherein
   the setting processing portion sets the first reference level based on the sound volume data that is obtained by the obtainment processing portion.

4. The operation mode control system according to claim 3, wherein
   the setting processing portion sets the first reference level based on the sound volume data obtained during a specific time period that is before image formation begins.

5. The operation mode control system according to claim 3, wherein
the setting processing portion sets the first reference level based on one or more pieces of the sound volume data, among one or more pieces of the sound volume data obtained by the obtainment processing portion, excluding those indicating sound volume that is higher than or equal to a second reference level that is higher than the first reference level.

6. The operation mode control system according to claim 5, wherein
the second reference level is preset to a sound volume level of an operation sound that is made by the image forming apparatus during execution of the image formation.

7. The operation mode control system according to claim 3, wherein
the setting processing portion sets the first reference level based on one or more pieces of the sound volume data, among one or more pieces of the sound volume data obtained by the obtainment processing portion, excluding those indicating sound volume that is lower than or equal to a third reference level that is lower than the first reference level.

8. The operation mode control system according to claim 1, wherein
the obtainment processing portion obtains, from one image forming apparatus among a preset plurality of image forming apparatuses, an execution state of image formation in the image forming apparatus, and
when the execution state of any of the plurality of image forming apparatuses indicates that the image formation is being executed, the shift processing portion shifts the other image forming apparatus(es), among the plurality of image forming apparatuses, from the second mode into the first mode.

9. An image forming apparatus, comprising:
the operation mode control system according to claim 1; and
an image forming portion configured to execute image formation.

* * * * *